Feb. 3, 1925.
P. E. HEDLEY
1,525,384
CULTIVATOR FOOT
Filed May 16, 1922
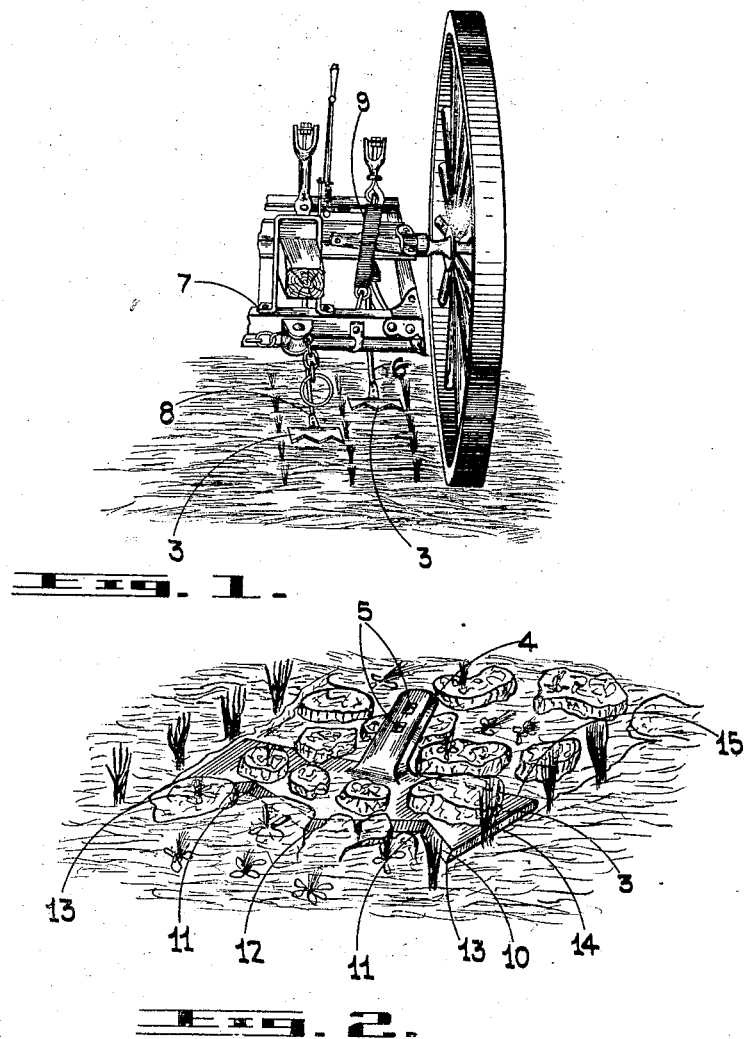
INVENTOR
PERCY E. HEDLEY.
BY
ATTORNEY Patented Feb. 3, 1925.

1,525,384

UNITED STATES PATENT OFFICE.

PERCY E. HEDLEY, OF OAK RIVER, MANITOBA, CANADA.

CULTIVATOR FOOT.

Application filed May 16, 1922. Serial No. 561,497.

*To all whom it may concern:*

Be it known that I, PERCY E. HEDLEY, a citizen of the Dominion of Canada, and resident of Oak River, in the county of Marquette and Province of Manitoba, Dominion of Canada, have invented certain new and useful Improvements in Cultivator Feet, of which the following is a specification.

This invention has relation to certain new and useful improvements in a cultivator foot or scraper blade which may be applied to cultivators of conventional form without alteration in the construction and operation thereof.

The invention has for another object the provision of a cultivator foot or scraper blade of the character stated which will be of extremely simple construction, inexpensive to manufacture and highly efficient in use.

Another object of the invention resides in the provision of a cultivator foot or scraper blade of the character stated which will be constructed so as to ride between the rows of plants and break up the soil in such a manner as to destroy weeds and the like from between the rows and close to the plants.

The invention has for a further object the provision of a cultivator foot or scraper blade adapted to ride beneath the surface and having an irregular beveled cutting or working edge so as to clear the ground between the rows of plants of weeds and the like.

The invention has for a still further object the provision of a cultivator foot or scraper blade of the character stated which has its beveled cutting or working edge divided into sections extended at different angles from the forward corners of the blade and from the longitudinal centre of the cutting edge, so that all weeds and the like may be cut away from between the rows, the cutter blade being constructed so as to remove the roots and entire growth of the weeds.

Still another object of the invention resides in the provision of a cultivator foot or scraper blade of the character stated which will be formed so that the attaching shank projecting from the rear edge of the blade will be extended upwardly at an appropriate angle for attachment to the cultivator foot carrying standard of a conventional form of cultivator, the cultivator foot or scraper blade extending in a horizontal plane so as to ride properly below the roots of the weeds during operation of the cultivator.

With the foregoing and other objects in view, as will appear as the description proceeds, the invention consists in the novel construction, combination and arrangement of co-operating elements as hereinafter more specifically set forth, claimed and shown in the accompanying drawings forming a part of the present application, in which:

Fig. 1 is a perspective view of a portion of a conventional form of cultivator with my improved foot or scraper blade applied thereto.

Fig. 2 is a detail perspective view of the cultivator foot or scraper blade removed and illustrating the operation of the blade.

Referring more in detail to the drawings in which similar reference characters designate corresponding parts throughout the several views, 3 indicates in general the cultivator foot or scraper blade having the attaching shank 4 extended at an angle from the central portion of its rear longitudinal edge. This attaching shank 4 has a plurality of openings 5 preferably square and countersunk so that the cultivator foot or scraper blade 3 may be securely held on a standard 6 of the cultivator 7 through the medium of the usual attaching bolt 8, as will be readily understood by parties familiar with this art. Suitable resilient mounting means 9 of the cultivator 7 may be connected with the standard 6 thereof in the usual manner to assure efficient operation of the cultivator or scraper blade 3. When the scraper blade 3 is properly attached, the entire blade will extend in a substantially horizontal plane and will ride along between the rows of plants as indicated by the drawings. In operation the blade 3 should be forced into the soil so as to ride beneath the surface and uproot the weeds and other growth from between the rows of plants, as shown clearly in Fig. 2. As the machine operates the blade 3 breaks up the soil between the rows of plants and discharges the broken soil and uprooted weeds over its rear edge, as shown in Fig. 2.

In order to increase the efficiency of the cultivator foot or scraper blade 3 to the maximum the forward or working longitudinal edge 10 thereof is beveled and substantially V-shaped cuts are formed in this beveled edge 10 on opposite sides of the longitudinal centre of the cultivator foot or scraper blade 3, as shown at 11. This provides a pointed central portion 12 and pointed end or corner portions 13. The corner portions 13 and the pointed central portion 12 are connected with the inner or central portions of the cuts 11, by the angularly extended working portions of the beveled working edge 10. The blade 3 also has straight end portions 14 at right angles to the straight longitudinal rear edge 15 of the blade. This will permit the blade 3 to work close to the plants while operating between the rows thereof, as shown in the drawings. The entire structure and operation of the blade should be apparent from the drawings, particularly Fig. 2.

It is to be understood that the cultivator foot or scraper blade 3 is of proper size to work between the two rows of plants without injury to the latter when the cultivator foot or blade 3 is properly mounted on the supporting standard 6 of an ordinary cultivator structure, as disclosed in Fig. 1. It is also evident that any number of scraper blades 3 may be employed, according to the construction of the cultivator.

The operation of the cultivator foot or scraper blade as well as the construction thereof should now be evident to parties familiar with this art without further detailed description. It may be briefly stated, however, that the cultivator foot or scraper blade serves to break up effectively the soil between the rows of plants to completely destroy the weeds and other growth in the soil by uprooting of the same, uprooted weeds and other wild growth riding over the scraper blade 3 with the broken soil and discharging with the latter over the rear longitudinal edge of the scraper blade 3. This operation is performed without injury to the plants, although the scraper blade works close to the rows of plants. The desired width of scraper blade 3 may be readily mounted on or removed from the supporting standard 6 of the cultivator 7.

While the preferred embodiment of the invention has been disclosed, it is to be understood that minor changes may be resorted to within the scope of what is claimed without departing from the spirit of the invention.

What I claim as new is:

As an improved article of manufacture, a cultivator foot having an integral attaching shank extending at an upwardly inclined angle from its mid length, said foot being in the form of a broad flat plate with its rear face straight and its side faces straight and at right angles to the rear face and the front edge formed with a central pointed portion, the side portions of the plate being formed with substantially V-shaped cuts upon opposite sides of the central pointed portion and having corner portions, the central and corner portions being beveled.

In testimony whereof, I affix my signature.

PERCY E. HEDLEY.